United States Patent [19]

Hagirahim

[11] Patent Number: 5,214,645
[45] Date of Patent: May 25, 1993

[54] TDM SYSTEM AND METHOD HAVING TIME SLOT REQUEST SIGNALING

[75] Inventor: Hassan Hagirahim, Lisle, Ill.

[73] Assignee: AT&T Bell Laboratories, Murray Hill, N.J.

[21] Appl. No.: 534,072

[22] Filed: Jun. 6, 1990

[51] Int. Cl.$^5$ ............................................. H04J 3/02
[52] U.S. Cl. .................................. 370/85.1; 370/94.1
[58] Field of Search .................. 370/85.1, 85.2, 85.7, 370/85.11, 94.1, 60, 85.15, 85.9, 85.5, 85.6; 340/825.5, 825.51

[56] References Cited

U.S. PATENT DOCUMENTS

| | | | |
|---|---|---|---|
| 4,366,480 | 12/1992 | Van Hatten | 370/85.6 |
| 4,730,307 | 3/1988 | Hughes et al. | 370/94.1 |
| 4,751,700 | 6/1988 | Ulug | 370/94.1 |
| 4,763,321 | 8/1988 | Calvignac et al. | 370/94.1 |
| 4,926,418 | 5/1990 | Cidon et al. | 370/85.5 |
| 4,977,557 | 12/1990 | Phung et al. | 340/825.5 |
| 5,001,707 | 3/1991 | Kositpaiboon et al. | 370/94.1 |
| 5,038,346 | 8/1991 | Courtois | 370/94.1 |
| 5,038,347 | 8/1991 | Courtois | 370/94.1 |
| 5,051,742 | 4/1991 | Hullett et al. | 370/85.1 |

Primary Examiner—Douglas W. Olms
Assistant Examiner—Dang Ton
Attorney, Agent, or Firm—John A. Caccuro

[57] ABSTRACT

A multi-user Time Division Multiplex (TDM) system includes a plurality of stations connected by one or more unidirectional data buses. A "queue of request" (QR) counter is added to each station having destination slot release capability (erasure station). The QR count indicates how many idle time slots on a first channel have been released by an erasure station. The QR counter is incremented when that station becomes active (i.e., has a data transmit request) and when a request bit on a second channel has been erased by that erasure station. The QR counter is decremented when a used time slot on the first channel is released to an idle time slot condition as long an outstanding requests exist from downstream stations. When the QR count is negative (indicating more released time slots than erased requests) that station erases a request signal on the channel opposite the channel when the time slot was released. When the QR count is positive (indicating that there are fewer released time slots than the total number of received and erasure station request signals), that station writes an additional request signal to its respective upstream or downstream stations. When the QR count is zero, request signals are not altered by that station. A separate QR counter and associated circuitry is utilized by each unidirectional bus of the TDM system.

24 Claims, 4 Drawing Sheets

STATION IDLE

ERASURE STATION ACTIVE

FIG. 5  SLOT RELEASE STATE
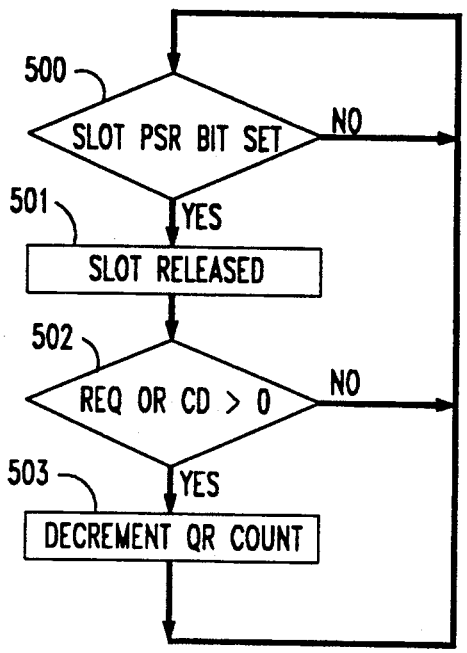
FIG. 6
WRITE/ERASE REQ BIT STATE
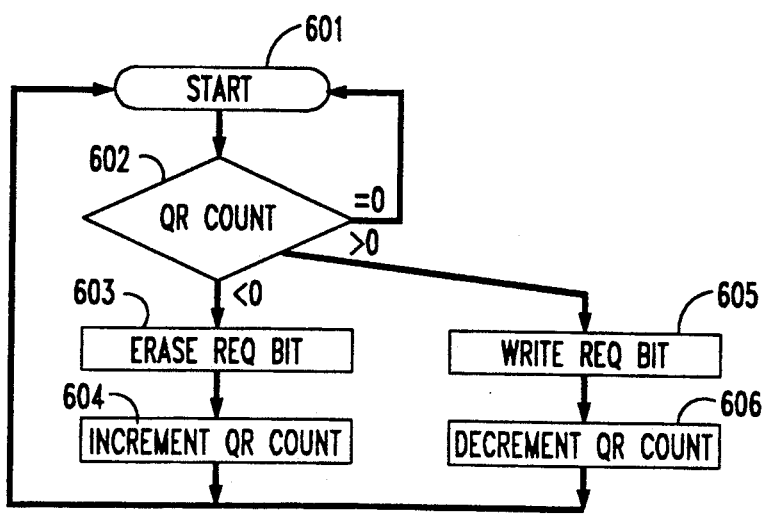

5,214,645

TDM SYSTEM AND METHOD HAVING TIME SLOT REQUEST SIGNALING

TECHNICAL FIELD

The present invention relates to time division multiplex (TDM) systems and, more particularly, to a method and arrangement for enabling stations of the TDM system to signal each other regarding requests made for idle time slots.

BACKGROUND OF THE INVENTION

Time Division Multiplex (TDM) systems typically include a TDM bus and a plurality of stations connected to the bus. One such TDM data communication system is a Metropolitan Area Network (MAN) which utilizes a standardized (IEEE 802.6 protocol) Distributed Queuing Dual Bus (DQDB) arrangement. The DQDB arrangement consists of two unidirectional buses with a plurality of stations connected between the buses. Each station sends and receives data in time slots on the buses. The use of a time slot by a station makes that slot unavailable for use by other "downstream" stations on each bus.

To ensure that "upstream" stations do not unfairly monopolize the idle time slots, each station includes request (REQ) and countdown (CD) counter. When a station is idle, the REQ counter connects to a first bus and increments its count when requests for idle slots are received from downstream stations and decrements its count when empty time slots are received over the second bus. Thus, at any point in time, the REQ counter at each station indicates the unfulfilled requests for idle time slots from downstream stations. When a station becomes "active" and requests to transmit information the REQ count is transferred to the CD counter. The active station knows that its turn to transmit occurs when the CD counter reaches zero.

The present IEEE 802.6 protocol also includes a time slot reuse or destination release capability which enables a destination station to return a busy time slot to an idle time slot once it has reached that destination station. However, this time slot reuse capability requires that a new field, negative request (NR) field, in the header of each time slot be used to decrement the REQ counter to maintain the proper count of outstanding requests for idle time slots. Undesirably, the utilization of an NR field in the header depletes the protocol of valuable fields which may be needed for future features now being developed.

SUMMARY OF THE INVENTION

In accordance with the method and apparatus of the present invention, stations of a TDM system are arranged to provide a destination release (DR) capability without requiring an inter-station signaling, i.e., without utilizing the additional NR field in the header.

More particularly, an additional "queue of request" (QR) counter is added to each station having destination slot release capability (erasure station). The count of the QR counter indicates how many idle (i.e., empty) time slots on a first channel have been released by an erasure station. The OR counter is incremented when that station becomes active (i.e., generates a data transmit request) and when a request bit from a second channel has been erased. The QR counter is decremented when a used time slot on the first channel is released to an idle time slot condition. Thus, the QR counter helps to balance the opportunity for stations located upstream and stations located downstream from an erasure station to seize an idle time slot.

When it is determined that the QR count is less than zero (indicating more released time slots than erased requests) a station erases a request (REQ) signal received on the bus opposite the bus where the idle time slot was released and increments the QR counter. When it is determined that the erasure station's QR count is greater than zero (indicating that there are fewer released time slots than the total number of received and erasure station request signals), that station writes an additional REQ signal and transmits it to the upstream stations and then decrements the QR counter. When the QR count is zero, REQ signals are not altered by that station. When the TDM system includes two unidirectional data communication buses, a separate QR counter and associated circuitry is required for each bus.

BRIEF DESCRIPTION OF THE DRAWING

In the drawing,

FIG. 5 shows a flow chart of the operation of an erasure station in releasing time slots and decrementing the QR counter; and FIGS. 6 and 7 show a flow chart of the effect of the QR counter count on the status of REQ bits transmitted from the erasure station.

DETAILED DESCRIPTION

Figure 1:
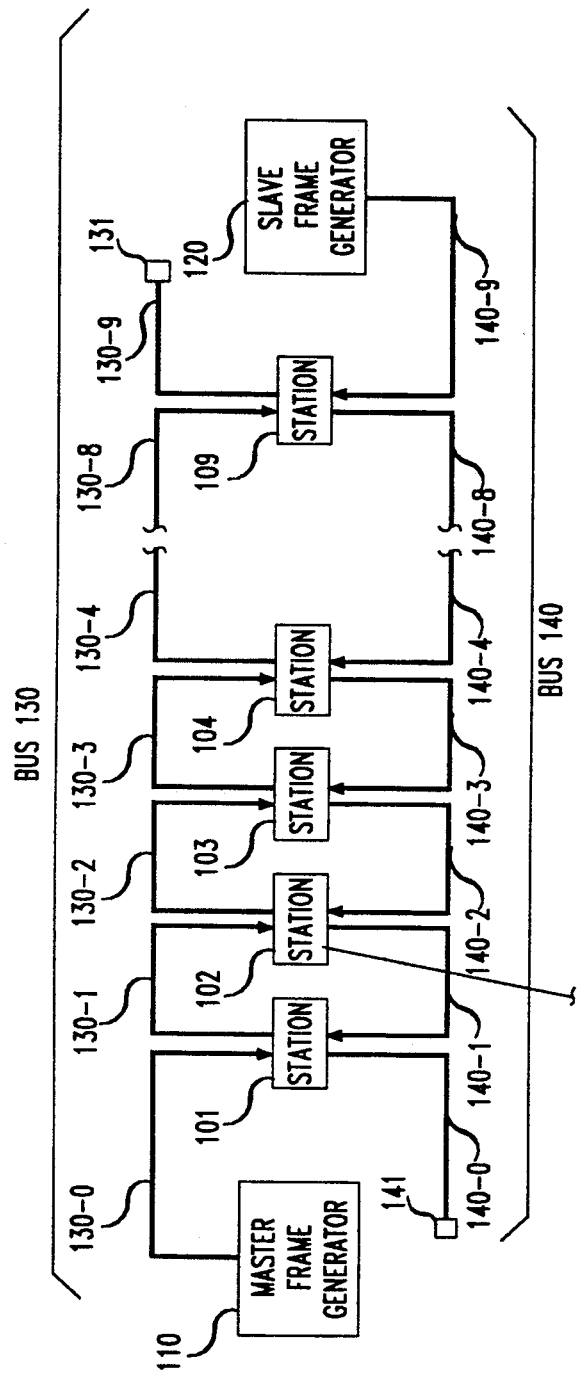
FIG. 1 shows an illustrative TDM system useful in describing the operation of the present invention.

Shown in FIG. 1 is an illustrative block diagram of a Time Division Multiplex (TDM) system 100 including a plurality of nodes or stations 101–109, master frame generator 110, slave frame generator 120, and two unidirectional buses 130 and 140. The main function of the master and slave frame generators 110 and 120, respectively, is to construct and send fixed time slots, in the frame format shown in FIG. 2, onto the buses 130 and 140, respectively. The bus 130 connects in series with stations 101–109 to enable the transmission of information (i.e., control and data signals) from left to right. Similarly, bus 140, which is symmetrically identical to bus 130, connects in series with stations 101–109 to enable the transmission of information from right to left. Thus, station 102 uses bus 130 to send data to stations 103–109, while it uses bus 140 to send data to station 101.

It should be noted that the various segments of bus 130, namely, 130-0 through 130-9 could be implemented using any of a variety of transmission facilities, using any appropriate data speed and modulation scheme, and using fiber, copper or air as the transmission medium. Moreover, adjacent bus segments, e.g., 130-1 and 130-2, do not have to be identical, they can utilize different transmission media each using different modulation schemes. Bus 140 may be similarly implemented. Thus, buses 130 and 140 may be implemented using any well-known type of communication channels which enable communications between the various apparatus connected thereto. Bus terminations 131 and 141, respectively, terminate the buses 130 and 140.

An illustrative example of the general operation of stations 101-109 in transmitting and receiving data in time slots over the buses 130 and 140 is described in our co-pending U.S. patent application, Ser. No. 407,998 entitled "Time Division Multiplex System and Method Having a Time Slot Reuse Capability" filed by inventors, A. Perdikaris and M. Rodrigues, which description is incorporated herein by reference. For purposes of discussion, circuitry used to control the transmitting and receiving of data over buses 130 and 140 is referred to hereinafter as a station controller, e.g., 102-9 shown in FIG. 7.

Figure 7:
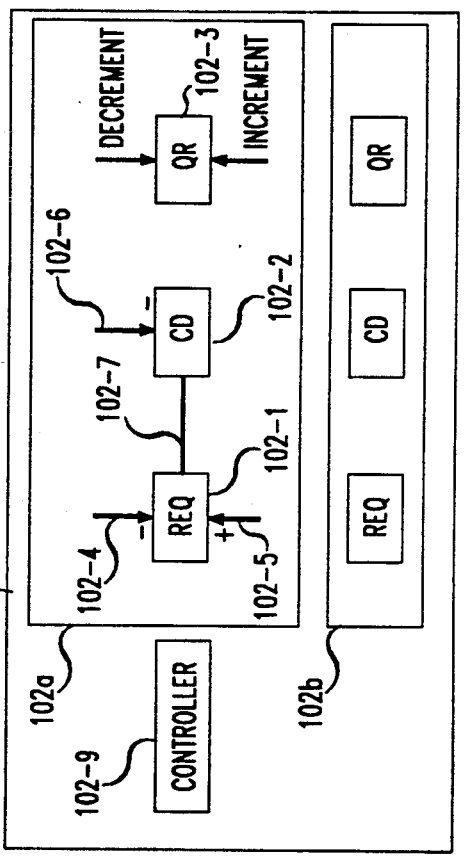

In addition to the station controller 102-9, shown in FIG. 7, which functions as described in the above-referenced patent application, each station in accordance with the present invention, further includes circuitry unit 102a and 102b which keeps track of time slot utilization over buses 130 and 140, respectively. Circuitry unit 102a utilized with bus 130 includes a request counter (REQ) 102-1, a countdown (CD) counter 102-2 and a Queue of Request (QR) counter 102-3. Another set of REQ,CD and QR counters, is included in circuitry unit 102b which keeps track of time slot utilization over bus 140. The operation of the counters of circuitry unit 102b operate in the same manner and perform the same function for bus 140 as circuitry unit 102a performs for bus 130.

In the following description, I describe in FIG. 7 only the scenario of station 102 desiring to transmit over bus 130 to stations downstream from it, i.e., stations 103-109. The communication from station 102 to station 101 would take place in an analogous manner over bus 140.

For symbolic purposes only, I describe REQ counter 102-1 as having access to bus 130 via lead 102-4 and access to bus 140 via lead 102-5. Symbolically, CD counter 102-2 is shown connected to bus 130 via lead 102-6. The REQ counter 102-1 connects to CD counter 102-2 via lead 102-7. The detailed operations of the REQ, CD and QR counters, in accordance with the present invention, are described in detail in a later paragraph with reference to the flow charts of FIGS. 3-5.

Figure 2:
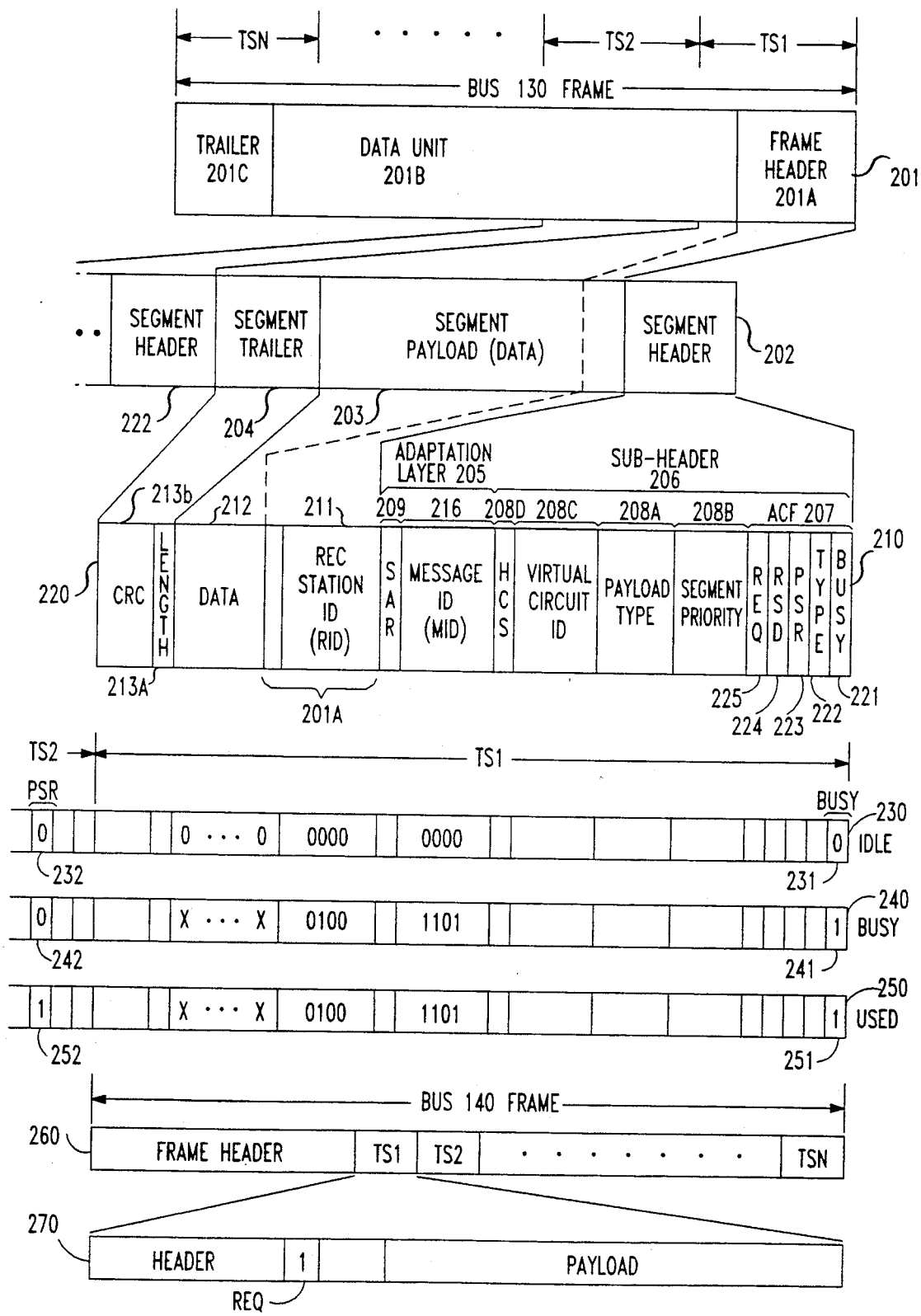
FIG. 2 shows a data frame format, the format of a time slot and illustrative examples thereof.

With reference to FIG. 2, we describe an illustrative data frame format used by the system shown in FIG. 1. The same data frame format is used on buses 130 and 140. The illustrated frame format is representative of an IEEE 802.6 protocol which uses the Asynchronous Transfer Mode (ATM) slot format.

Data frame 201 is the standard 802.6 frame which includes a frame header 201A, a data unit 201B, and a trailer 201C. The 802.6 frame is segmented into time slots TS1-TSN. Each time slot (hereinafter slot, e.g., TS1) would typically include a plurality of time intervals including a segment header 202, a payload or a data section 203 and a segment trailer 204. The segment header 202 includes, illustratively, a sub-header 206, and an adaption layer 205. The sub-header 206 may include multi-user access information, e.g., access control field (ACF) 207; payload type 208A, priority information 208B, address information e.g., virtual circuit identifier (VCI) 208C and a header check sequence (HCS) 208D. The adaption layer 205 may include a message identification number (MID) 216 and a segmentation and reassembly (SAR) field 209.

The ACF field 207 includes a plurality of bits. The first is a busy bit 221 which indicates whether a slot is busy (i.e., contains data) or idle (i.e., is empty or contains no data). The second bit is the type field 222 which indicates whether a slot is dedicated for isochronous or non-isochronous traffic. The third bit is the previous segment read (PSR) bit 223. The PSR bit indicates whether the previous segment (i.e., time slot) has been read. Thus, if slot TS1 was read, the PSR bit 223 in slot TS2 would indicate that condition. The PSR bit is used for the destination release operation which enables the reuse of a slot which has reached its destination. The fourth bit RSD 224 is reserved by the protocol for future use. The remaining bit of the ACF field 207 is called the request (REQ) field 225. This REQ field 225 consists of four bits, each bit assigned for non-isochronous traffic with a given level of priority. The function of particular bits of the ACF field 207 as utilized by the present invention is described in later paragraphs.

The adaption layer 205 includes the message identification number (MID) 216 and the segmentation and reassembly field (SAR) 209 bits assigned to the message by the station that originated the transmission of the message. Messages of variable sizes can be transmitted over the system of FIG. 1. The transmitted message includes the frame header 201A, data unit 201B and trailer 201C. Note, the frame header 201A includes the received station identification (RID) 211. When the transmitted message exceeds the segment payload 203 (i.e., TS1), the message is segmented into multiple slots (as many as required). Each of these slots is identified using the same MID 216 and the appropriate segmentation and reassembly field (SAR) 209 bits. The SAR 209 bits define whether the slot contains the beginning, continuation or last slot of data of a message requiring multiple slots to transmit. In a multiple slot message the first slot contains MID 216, SAR 209 and RID 211 while the subsequent messages include only MID 216 and SAR 209.

The payload 203 segment of the first slot TS1 is used to send the frame header 201A and all or part of a data message. The payload 203 segment contains the frame header 201A including the receive station identification (RID) 211 and some or all of the data 212 of that message as well as the length field 213A and correction/detection information (CRC) 213B. As noted, a long message may require several slots (e.g., TS1, TS2 etc.) while a shorter message may require only one slot (e.g., TS1). The RID 211 of each slot is monitored by each station 201-205 as each slot passes over bus 150 and when RID 211 matches a station's address, that station reads the information in that slot. If segmentation and reassembly field (SAR) 209 indicates that the slot is the first slot of a multi-slot message, the station stores the message identification address (MID) 216 for use in identifying subsequent slots associated with the multi-slot message.

With joint reference to FIGS. 1, 2 and 7 we describe the operation of the present invention. Master frame generator 110 includes well-known circuitry for continuously generating frames 201 of empty or idle slots shown by 230 and outputting them over segment 130-0. Slave frame generator 120, similarly and in synchronism with master frame generator 110, continuously outputs a frame 201 of empty slots as shown by 230, over bus segment 140-9.

With reference to FIGS. 1, 2, 3, and 7 an illustrative prior art operation of a station (e.g., 102), is described.

The main function of REQ counter 102-1 and CD counter 102-2 is to perform a distributed global queuing for station 102 as described below. Station 102 is defined as idle hereinafter, when it does not have any data packets to send. In this situation, the REQ counter 102-1 and QR counter 102-3 are active, the CD counter 102-2 is inactive.

Figure 3:
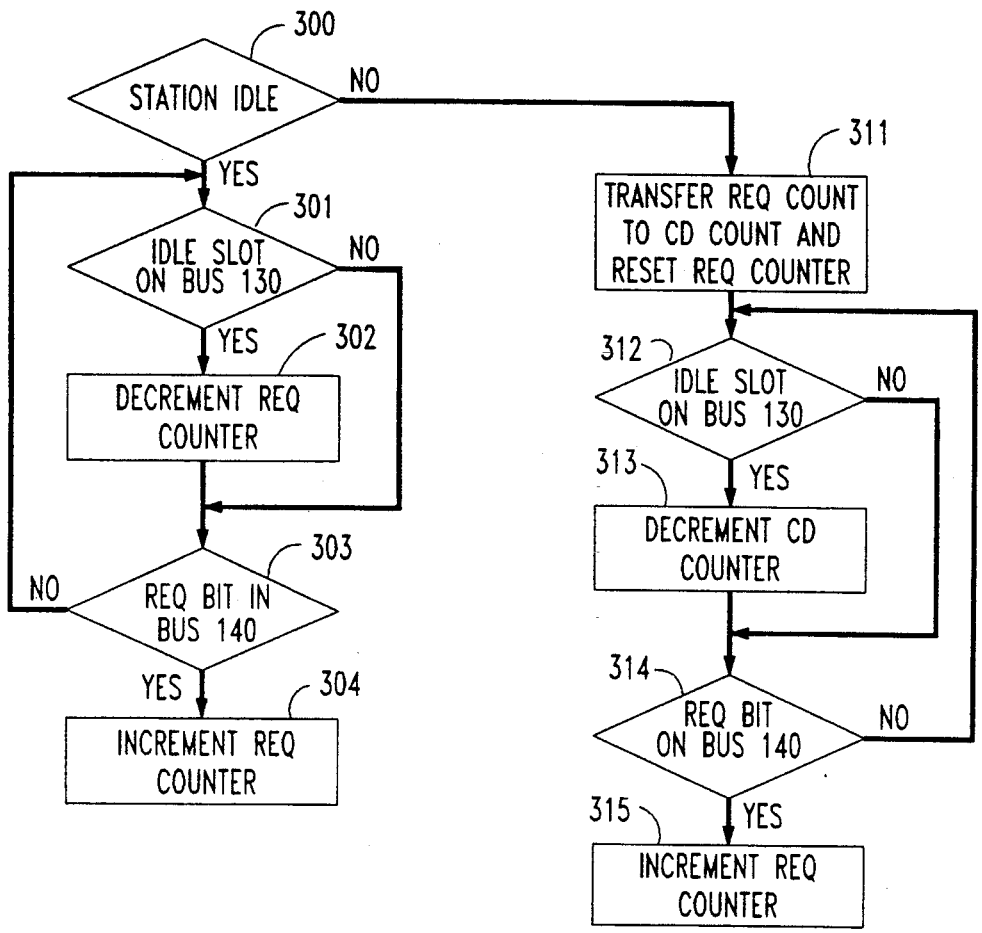
FIG. 3 is a flow chart of the idle and active mode of operation of a prior art station including request (REQ) and countdown (CD) counters.

FIG. 3 illustrates a flow chart which describes the idle mode of operation in steps 300-304. The REQ counter 102-1 is decremented (step 302), by a signal received over line 102-4, each time an idle slot (step 301) is detected at station 102. Station 102 determines when a slot is idle by detecting the busy bit 221. The REQ counter 102-1 is incremented (step 304), by a signal received over line 102-5, each time a request bit 225 is detected (step 303) at station 102. Thus, the REQ counter 102-1 maintains a running count that indicates whether the number of requests for slots, received over bus segment 140-2, from all stations located downstream (i.e., stations 103-109) have been met by the supply of idle time slots received over bus segment 130-1. Thus, when REQ counter 102-1 is positive, it indicates that downstream stations 103-109 still have outstanding requests for slots, and when REQ counter 102-1 reaches zero it indicates that no outstanding requests for slots exist from downstream stations 103-109. Note, however, that REQ counter 102-1 is not permitted to reach a negative count, indicating more idle slots are being supplied than there are requests for.

As soon as station 102 prepares to send a data packet (either generated locally or from apparatus directly connected to station 102) which is to be transmitted to another station of the TDM system 100, it enters the active state. In the active mode, station 102 is trying to fairly determine when its turn is to send a data packet over the TDM system 100. This is determined from the count in REQ counter 102-1. For example, if REQ counter 102-1 has a count of three when station 102 is ready to transmit a data packet, it means that it would be fair to other stations if station 102 took the fourth available slot for its own data packet transmission. This is accomplished as described in the following paragraphs.

With reference to the flow chart of FIG. 3, when station 102 enters the active state, in step 311, the contents of REQ counter 102-1 are transferred to CD counter 102-2, via lead 102-7.

In the active state, the CD counter 102-2 is only decremented by idle slots, i.e., 230 on bus 130 as shown in steps 312 and 313. Meanwhile, the REQ counter 102-1, in steps 314 and 315, is only incremented using REQ bits 225 received over bus 140. When CD counter 102-2 becomes equal to zero, station 102 goes to the wait state. This means that station 102 can use the next free slot that is received. This means that if station 102 wants to transmit to, for example, station 104, it must wait until CD counter 102-2 becomes zero.

Station 102 must also inform all upstream stations, i.e., station 101, via bus 140, that it requires a free slot. This is done by setting a request bit REQ in slot 270 (e.g., TS1) of data frame 260 transmitted on bus 140. If station 102 does not find a cleared REQ bit in the next time slot on bus 140 it assumes that the set REQ bit from a downstream station 103-109 belongs to it (thereby justifying that it can use it). Thus, for example, if the REQ count was three, station 102 would assume that the fourth empty slot on bus 130) should belong to it. Thereafter, station 102 remembers to set a REQ bit in the next slot which has a cleared REQ bit. In this manner, the overall operation at station 102 is "fair" to other stations and improves the overall efficiency of the system.

A data packet transmission from station 102 to station 104 proceeds in the manner now described. When station 102 receives an idle slot 230 from main frame generator 110 over bus segment 130-1, the busy bit 221 of slot 230 is checked to ascertain whether the slot 230 is idle of full. Note, slot 230 is always empty or idle for the first station 101 on bus 130, but this condition may not be so for the other stations (102-109) further down bus 130.

As will be discussed in the following paragraphs, stations 101-109 may determine that a slot is idle, busy, or used by checking the status of busy bit 210 and previous slot read (PSR) bit 223. An idle or empty slot 230 is indicated when the status of busy bit 231 is logic 0 as shown. An occupied or busy slot 240 is indicated when the status of the busy bit 241 of that slot (i.e. TS1) is logic 1 and whether PSR bit 242 of the subsequent slot (i.e., TS2) is logic 0. As previously noted, the PSR bit for a slot TSN-1 is located in a subsequent slot TSN. A read or used slot 250 is indicated when the status of both its busy bit 251 and its associated PSR bit 252 are logic 1.

In our example, since slot 230 is empty, station 102 inserts a message identification number (MID) 216 (corresponding to the message number); receive station identification (RID) 211 (corresponding to the destination station number 104); data (X . . . X); slot read (PSR) bit 223 at logic 0; and sets the busy bit 210 to logic one. Station 102 outputs this information in the format shown by 240. Note, if the message from station 102 is longer than the available bits in the payload 203, then segmentation and reassembly bits (SAR) 209 are set to indicate to receiver station 103 that this slot is the first slot of a multi-slot message. We assume that station 102 is sending a message requiring only one time slot 240 for transmission to station 104.

Station 103 receives over bus segment 130-2 the message in slot 240 and determines from receive station identification (RID) 211 that it is not the destination station for slot 240. Station 103 processing delays the transmission only one bit time, as described in the above-identified Perdikaris application, and thereafter transmits the message over bus segment 130-3.

Station 104 receives the slot 240 over bus segment 130-3 and determines from RID 211, that it is the destination station for the message (information) in slot 240. After reading the message, station 104 sets the status of slot read (PSR) bit 223 to indicate that the slot has been read. Station 104 processing delays the transmission only one bit time and then transmits the modified message in slot 240 over bus segment 130-4.

As described in the Perdikaris application, one or more of the stations 101-109 may also incorporate an erasure feature. The erasure feature enables a station to erase part or all of the information contained in all slots which are read at that station or which are received with a PSR bit 223 indicating that the slot has been read (PSR bit 223 is logic 1). This is shown as a used time slot 250. Note, each station having the erasure feature requires a delay of about one slot time in order to capture the associated PSR bit 223 which occurs in the time slot following the time slot where the receive station (RID) address 211 and data 212 is located. That is, the PSR bit for slot TS1 is found in TS2, etc.

The erasure feature enables a station to erase or clear all of the bits of the time slot except, perhaps, selected bits of ACF field 207 depending on the particular contention resolution protocol used. If station 104 has the erasure feature, the used time slots 250 would be returned to an idle slot, 230. As a result, stations such as 105–109 could reuse the empty time slot 230 to transmit messages to other stations.

In order to maintain fairness among all the stations, each time a station having an erasure capability releases a slot, in a transmission received over bus 130, it should erase a REQ bit 225 in a slot 270 of a transmission in the opposite direction (i.e., on bus 140). However, since a station incorporating an erasure feature may or may not send data packets to other stations, it becomes somewhat complicated as to when that station should erase or set a REQ bit 225. In accordance with the present invention, this problem is overcome using Queue of Request (QR) counter 102-3. The following description assumes station 102 incorporates the erasure feature.

Figure 4:
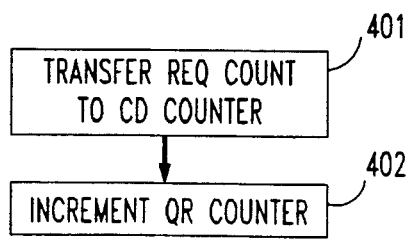
FIG. 4 shows the active mode of operation of an erasure station of a TDM system which utilizes a Queue on Request (QR) counter of the present invention.

With reference to FIG. 4, we first describe the operation of QR counter 102-3 when erasure station 102 becomes active (i.e., station 102 desires to transmit a data packet to another station). In step 401, the contents of REQ counter 102-1 is transferred to CD counter 102-2. In step 402, the count of QR counter 102-3 is incremented, irrespective of its present count. The QR count indicates how many idle time slots have been released by the erasure station 102 for use by downstream stations 103–109. Note, a negative QR count indicates that station 102 has generated a certain number of empty time slots over bus 130.

With reference to FIG. 5, in accordance with the present invention, the slot release operation is described for erasure station 102. The operation described in the FIG. 5 flow chart applies whether erasure station 102 is in the active or the idle state.

In step 500, when PSR bit 223 associated with a slot is set, it indicates to erasure station 102 that the data in that time slot has been "read" or "used" and should be erased. Thus, with reference to the "used" slot 250 shown in FIG. 2, since PSR bit 252 is set in slot TS2, then slot TS1 should be erased as described in an earlier paragraph. Recall that in the presently disclosed embodiment, the PSR bit for slot (e.g., TS1) is located in a subsequent slot (e.g., TS2).

In step 501, the slot is erased, that is, released and returned to an idle state. An erased or idle slot is shown 230 of FIG. 2 with its busy bit 231 and PSR bit 232 set to logic 0. In step 502, erasure station 102 determines the count in REQ counter 102-1 and CD counter 102-2. If either count is greater than zero, then the QR counter 102-3 is decremented. If both REQ and CD counters are zero, then control is returned to step 500.

With reference to FIGS. 6 and 7, I describe the operation of erasure station 102 on the status of any REQ bit 225 received over bus 140 from one of the downstream stations 103–109. In step 601, erasure station 102 may be in the idle or active state. In step 602, the QR counter 102-3 count is checked. If the QR count is zero, then erasure station 102 does not change the status of any REQ bit 225 that it receives. What this means is, since the QR count is zero there are no outstanding requests received over bus 140 from downstream stations 103–109 and, hence, there is no shortage of empty (i.e., idle) time slots headed to downstream stations 103–109 over bus 130.

In step 602, assume that the QR count is negative, indicating that there is an excess of empty or idle time slots on bus 130 for downstream stations 103–109. Consequently, in step 603 when a set REQ bit 225 is received over bus 140 at erasure station 102, it is erased and transmitted upstream from erasure station 102 as a cleared REQ bit. Since there is now one less excessive idle time slot, the QR count should be increased by one. In step 604, the QR counter 102-3 is incremented to reduce the negative count and control returned to step 601.

In step 602, we assume that the QR count is positive, indicating that there is an excess of local transmission requests for time slots from erasure station 102. Since QR counter 102-3 is only incremented when there are local transmission requests for slots from erasure station 102, a QR count greater than zero can only indicate that an outstanding transmission request exists at erasure station 102. Consequently, in step 605, when a cleared REQ bit 225 is received by erasure station 102 over bus 140, it is set and transmitted upstream therefrom. The positive QR count is now be decreased by one. In step 606, the QR counter 102-3 is decremented and control returned to step 601.

It should be noted that the present invention can be implemented as part of station apparatus including personal computers, work stations, servers, hosts, inter-networking devices, concentrators, printers, disk-servers, PBXs, digital phones, digital video or any data generating equipment.

Moreover, the implementation of the apparatus and flow charts of the present invention can be implemented using one or more integrated circuit chips using well-known Complementary Metal Oxide Semi-Conductors (CMOS), Very Large Scale Integrated (VLSI), Emitter Coupled Logic (ECL) or hybrid circuit technology. It is anticipated that other embodiments using any well-known semi-conductor technology can be utilized. Similarly, the invention can be implemented using a VLSI circuit-implemented finite state machine, a Reduced Instruction Set Controller (RISC)-based microprocessor or any of the conventional microprocessors.

It is anticipated that different slot formats 220 and other well-known circuit architectures can be adapted to successfully implement the features of the present invention. The slot and message formats presented in FIG. 2 are illustrative and serve to aid in understanding the present invention. It should be understood that in time slots which include a header 202, payload 203 and a trailer section 204 the control information located in the header section 202 can also be located in that trailer section 204. Such an arrangement is inconsequential to the operation of the present invention since the previous slot read (PSR) bit 223, busy bit 221 and REQ bit 225 utilized in the operation of the present invention could be placed anywhere as long as each erasure station is modified appropriately to enable access to the information. For example, as previously noted, the PSR bit 223 can be located in the slot that is being read rather than being located in a subsequent slot as illustratively disclosed herein.

Similarly, receiver station address 211 can be implemented using a media access control (MAC) address located in access control field (ACF) 207, a reassembly address like a message identification address (MID) 216, or a virtual circuit identifier (VCI) 208 as the destination station identifier.

Thus, what has been disclosed is merely illustrative of the present invention and other arrangements or methods can be implemented by those skilled in the art without departing from the spirit and scope of the present invention.

I claim:

1. A station for use in a time division multiplex (TDM) communication system including a plurality of stations communicating over first and second unidirectional communication channels, said station having the capability of converting read time slots into idle time slots and comprising
queue of request QR counter means for establishing a QR count indicating how many time slots over said first channel from other system stations have been converted into idle time slots by said station, and
means responsive to a first predetermined value in said QR count for altering a request signal being transmitted over said second channel, wherein said request signal indicates a request for an idle time slot and wherein said altering means erases said request signal and changes the value in said QR count.

2. The station of claim 1 wherein said read slots are read by said station.

3. The station of claim 1 wherein said altering means erases said request signal and increments said QR counter when said QR count is less than zero.

4. The station of claim 3 wherein said altering means writes an additional request signal for transmission over said second channel and decrements said QR counter when said QR count is greater than zero.

5. The station of claim 3 wherein said altering means, in response to said QR count being equal to zero, does not alter a request signal being transmitted over said second channel and does not change the QR count of said QR counter.

6. The station of claim 3 further comprising
request counter means for counting request signals on said second channel while said station is not in an active transmit mode,
countdown counter means for counting each idle time slot on said first channel when said station is in an active transmit mode,
means for transferring a request count from said request counter means to said countdown counter means when said station enters said active transmit mode, and
means for incrementing said QR counter when said station enters said active transmit mode.

7. The station of claim 6 further comprising
means for releasing a time slot addressed to said station,
means responsive to a released time slot for comparing both the count of said countdown counter and said request counter means to zero, and
means for decrementing said QR counter when said comparing means indicates that either said countdown count or said request count that is greater than zero.

8. The station of claim 7 further including bypass means for bypassing said decrementing means when said comparing means indicates that both said countdown count and said request count are equal to zero.

9. The station of claim 3 further comprising
a second queue of request QR counter means for establishing a second QR count, which indicates how many idle time slots of said second channel have been released by said station and
second altering means, responsive to a predetermined value in said second QR count, for altering a second request signal being transmitted over said first channel, wherein said second altering means erases said second request signal and changes the value in said second QR counter.

10. The station of claim 9 wherein second altering means writes an additional second request signal for transmission over said first channel and decrements said second QR counter when said second QR count is greater than zero.

11. A station for use in a time division multiplex (TDM) communication system including a plurality of stations communicating over first and second unidirectional communication channels, said station having the capability of converting read time slots into idle time slots and comprising
queue of request QR counter means for establishing a QR count indicating how many time slots over said first channel from other system stations have been converted into an idle time slot by said station and when said station can transmit data over an idle time slot of said first channel,
means for determining when said QR count is a first predetermined value or a second predetermined value, and
means for altering a request signal being transmitted over said second channel, said altering means erasing said request signal when said determining means has determined that said QR count is said first predetermined value and said altering means writing said request signal when said determining means has determined that said QR count is said second predetermined value.

12. The station of claim 11 wherein said altering means erases said request signal when said determining means has determined that said QR count is less that zero and said altering means writes said request signal when said determining means has determined that said QR count is greater than zero.

13. A station for use in a time division multiplex (TDM) communication system including first and second unidirectional communication channels, said station comprising
means for receiving information over said first channel in a time slot addressed to said station and for erasing said information from said time slot and
means responsive to the receiving and erasing by said receiving means for erasing a request signal being received over said second channel from another station, said request signal indicating to said station that a request exists for an empty time slot on said first channel.

14. A time division multiplex (TDM) communication system comprising
first and second unidirectional communication channels,
at least two stations connected to said channels, each station arranged to receive and transmit information over either said first or second unidirectional channel, at least one station including
means for receiving information over said first channel in a time slot addressed to said at least one station and for erasing said information from said time slot and means responsive to the receiving and erasing by said receiving means for erasing a request signal being received over said second channel from another station of said system indicating a request for an empty time slot on said first channel.

15. A time division multiplex (TDM) communication system comprising first and second unidirectional communication channels and a station connected to said channels and arranged to receive and transmit information over either said first or said second unidirectional channel, said station having the capability of converting read time slots into idle time slots and including queue of request QR counter means for establishing a QR count, indicating how many time slots over said first channel from other system stations have been converted into idle time slots by said station and when said station can transmit data over an idle time slot of said first channel, means responsive to said QR count, for altering a request signal being transmitted over said second channel, said request signal indicating a request for an idle time slot and, said altering means erasing said request signal and changing said QR count when said QR count is a first predetermined value.

16. The station of claim 15 wherein said read time slots are read by said station.

17. The system of claim 15 wherein said altering means erases said request signal and increments said QR counter when said QR counter is less than zero.

18. The system of claim 17 wherein at station said altering means writes an additional request signal for transmission over said second channel and decrements said QR counter when said QR count is greater than zero.

19. A method of operating a station for use in a time division multiplex (TDM) communication system having a plurality of stations communicating over first and second unidirectional communication channels, at least one station having the capability of converting read time slots into idle time slots, said method comprising the steps of:

establishing a queue of request QR count which indicates how many time slots over said first channel from other system stations have been converted into an idle time slot by an individual station and altering a request signal being transmitted over said second channel by erasing said request signal and changing the value in said QR count.

20. The method of claim 19 wherein said altering step erases said request signal and increments said QR counter when said QR count is less than zero.

21. The method of claim 20 wherein said altering step writes an additional request signal for transmission over said second channel and decrements said QR counter when said QR count is greater than zero.

22. A method of operating a station for use in a time division multiplex (TDM) communication system including a plurality of stations communicating over first and second unidirectional communication channels, said method comprising the steps of receiving information over said first channel in a time slot addressed to said station and for erasing said information from said time slot and in response to said receiving step erasing a request signal being received over said second channel; from another station, said request signal indicating to said station that a request exists for an empty time slot on said first channel.

23. A method of operating a time division multiplex (TDM) communication system including first and second unidirectional communication channels and at least two stations connected to said channels, each station arranged to receive and transmit information over either said first or said second unidirectional channel, at least one station having the capability of converting read time slots into idle time slots, said method comprising the steps of:

at least one station, establishing a queue of request QR count which indicates how many time slots over said first channel from other system stations have been converted into an idle time slot by an erasure station and altering a request signal being transmitted over said second channel by erasing said request signal and changing said QR count when said QR count is a first predetermined value.

24. The method of claim 23 wherein said altering step erases said request signal and increments said QR counter when said QR count is less than zero.

* * * * *